United States Patent [19]
Suh

[11] 3,882,172

[45] May 6, 1975

[54] β-SUBSTITUTED-DIHYDROXYPHENYL-ALANINES

[75] Inventor: John T. Suh, Mequon, Wis.

[73] Assignee: Colgate-Palmolive Company, New York, N.Y.

[22] Filed: June 26, 1973

[21] Appl. No.: 373,801

[52] U.S. Cl. ............ 260/519; 260/307 A; 424/319
[51] Int. Cl. .......................................... C07c 101/72
[58] Field of Search .................................. 260/519

[56] References Cited
FOREIGN PATENTS OR APPLICATIONS
998,355   6/1961   United Kingdom ................ 260/519

OTHER PUBLICATIONS

W. E. Coyne, The Synthesis of Phenylalanine and Dopa Derivatives, Doctoral Thesis, University of Virginia, (1964).

Primary Examiner—Lorraine A. Weinberger
Assistant Examiner—Patrick J. Hagan
Attorney, Agent, or Firm—T. F. Kryshak; M. L. Youngs

[57] ABSTRACT

The compounds are β-substituted-dihydroxyphenylalanines which are useful as antihypertensive agents and central nervous system depressants. The compounds are also useful as chelating agents for heavy metal ions. Among the compounds disclosed is β-(cyclohexyl)-3,4-dihydroxyphenylalanine.

2 Claims, No Drawings

β-SUBSTITUTED-DIHYDROXYPHENYL-ALANINES

DETAILED DESCRIPTION

The compounds of the present invention may be represented by the following formula:

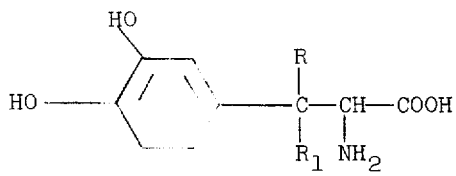

in which R is hydrogen or a lower cycloalkyl of three to 12 carbon atoms such as cyclopropyl, cyclobutyl, cyclopentyl, cyclohexyl and cyclooctyl, and $R_1$ is selected from hydrogen or a lower alkyl of one to eight carbon atoms such as methyl, ethyl, isopropyl, butyl, pentyl, hexyl or octyl.

In the preferred practice of the invention the β-substituted dihydroxyphenylalanines are prepared by first reacting N-acetylglycine, acetic anhydride and anhydrous sodium acetate at reflux with 3,4-dimethoxybenzaldehyde to form 4-(3',4'-dimethoxybenzylidene)-2-methyl-5-oxazolone. The thus obtained oxazolone is then reacted with a Grignard reagent prepared from magnesium and a bromocycloalkane under standard Grignard conditions to form the corresponding 4-[(α-cycloalkyl)-3',4'-dimethoxyphenmethyl]-2-methyl-5-oxazolone. The product thus obtained is then treated with aqueous sodium hydroxide at reflux to form the N-acetyl-β-cycloalkyl-3,4-dimethoxyphenylalanine. The resulting N-acetyl derivative is then treated with hydrobromic acid to form the desired β-substituted-dihydroxyphenylalanine.

The described process may be illustrated as follows:

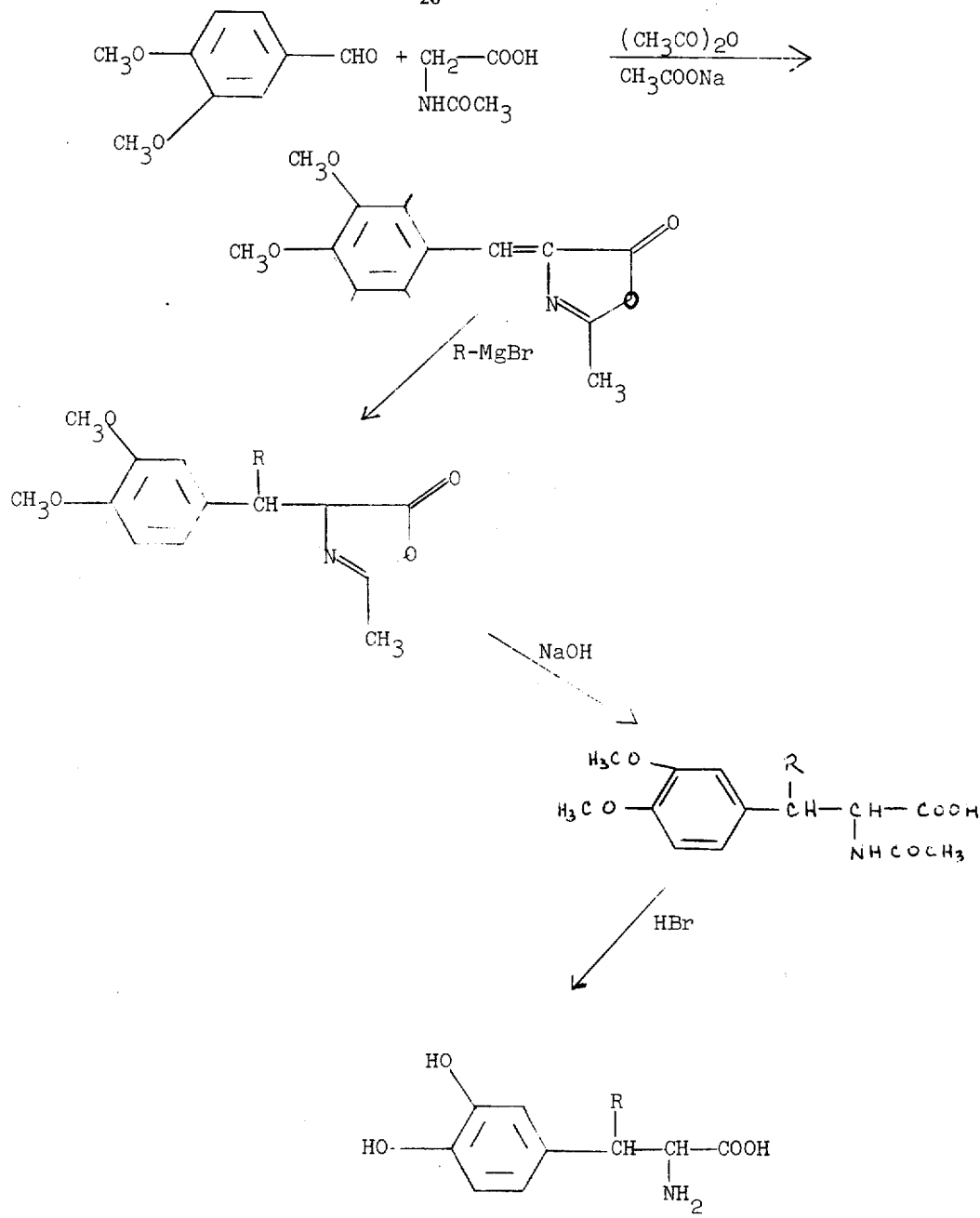

in which R is as previously defined.

Representative of the compounds which may be prepared in the manner described are the following:

β-(cyclohexyl)-3,4-dihydroxyphenylalanine,
β-(cyclopentyl)-3,4-dihydroxyphenylalanine,
β-(cyclobutyl)-3,4-dihydroxyphenylalanine,
β-(cyclopropyl)-3,4-dihydroxyphenylalanine,
β-(cycloheptyl)-3,4-dihydroxyphenylalanine,
β-(cyclooctyl)-3,4-dihydroxyphenylalanine,
β-(isopropyl)-3,4-dihydroxyphenylalanine,
β-(tert-butyl)-3,4-dihydroxyphenylalanine,
β-(propyl)-3,4-dihydroxyphenylalanine,
β-(ethyl)-3,4-dihydroxyphenylalanine,
β-(isopentyl)-3,4-dihydroxyphenylalanine,
β-(isohexyl)-3,4-dihydroxyphenylalanine,
β-(isobutyl)-3,4-dihydroxyphenylalanine, and
β-(isoheptyl)-3,4-dihydroxyphenylalanine.

The novel amino acids of the present invention can be employed as chelating agents for heavy metal ions, particularly iron ions, in chemical processes in which it is desired to inactivate the heavy metal ions to prevent them from interfering with the desired reactions. The compounds are readily soluble in warm water and can simply be added to the solution containing the undesired ions.

The novel compounds of the present invention are useful as pharmaceutical agents because of their antihypertensive and central nervous system depressant properties. For example, the compound β-(cyclohexyl)-3,4-dihydroxyphenylalanine was found to be effective in lowering blood pressure when administered in 100 mg/kg intraperitoneal doses to spontaneously hypertensive rats when measured by the indirect tail-cuff technique.

In animal behavioral tests the above-mentioned compound exhibited a central nervous system depressant activity. In mice receiving 100 to 300 mg/kg of the compound intraperitoneally in the form of a 5% acacia suspension, decreased alertness, reactivity, struggle response and other behavioral characteristics of central nervous system depression were observed. As a result of the behavioral studies, the compound was found to have $LD_{50}$ values in excess of 1,000 mg/kg. The behavioral studies were conducted in accordance with the procedure set forth by Irwin in "Animal and Clinical Pharmacologic Techniques in Drug Evaluation," J. H. Nodine and P. E. Seigler, Ed., Year Book Publishers, Inc., 1964, pp. 36–54.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt forming compounds with a suitable alkylating agent such as dimethyl sulfate, or an alkyl halide such as methyl chloride, methyl iodide or ethyl bromide.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily. In actual practice, the amount of drug required to produce the desired effect will, of course, vary considerably because of patient differences.

The following examples are presented to illustrate this invention:

EXAMPLE 1

4-(3',4'-dimethoxybenzylidene)-2-methyl-5-oxazolone

To 258 ml. (279 g., 2.73 moles) of acetic anhydride is added 80.0 g. (0.684 moles) of N-acetylglycine in one portion followed by 30.8 g. (0.376 moles) of anhydrous sodium acetate. 3,4-Dimethoxybenzaldehyde (139.3 g., 0.838 moles) is then added, and the mixture heated to an internal temperature of 98° in 1.5 hours, and maintained at 98°–104° for 0.5 hour. It is then heated to reflux in 1.5 hours, and maintained 1.5 hours. The solution is then cooled, diluted with 2 liters of water and stirred 0.5 hour. The solid is then collected, washed twice with cold 2-propanol and recrystallized from 1.1 liters of benzene after treatment with activated charcoal to yield 66.8 g. of 4-(3',4'-dimethoxybenzylidene)-2-methyl-5-oxazolone as an orange solid, m.p. 165°–169°.

EXAMPLE 2

4-[(α-Cyclohexyl)-3',4'-dimethoxybenzyl]-2-methyl-5-oxazolone

To a Grignard solution prepared from 4.01 g. (0.165 mole) of magnesium and 29.6 g. (0.182 mole) of bromocyclohexane in 280 ml. of tetrahydrofuran is added 20.4 g. (0.083 mole) of 4-(3',4'-dimethoxybenzylidene)-2-methyl-5-oxazolone in 5 minutes with ice bath cooling. The solution is stirred at 22° for 1.5 hours, and the complex decomposed with 25 ml. of saturated $NH_4Cl$ solution. The solid is collected and the filtrate concentrated to yield 32.5 g. of 4-[(α-cyclohexyl)-3',4'-dimethoxybenzyl]-2-methyl-5-oxazolone as a gold glass, m.p. 106°–108°.

EXAMPLE 3

N-Acetyl-β-cyclohexyl-3,4-dimethoxyphenylalanine

A mixture of 27.4 g. (0.083 mole) of 4-[(α-cyclohexyl)-3',4'-dimethoxybenzyl]-2-methyl-5-oxazolone in a solution of 33.0 g. (0.83 mole) of NaOH in 818 ml. of water is heated to reflux in 0.5 hour, maintained 0.75 hour, cooled and filtered through Dicalite. The filtrate was extracted three times with chloroform, treated with activated charcoal, and filtered. The filtrate is then placed in a separatory funnel. Chloroform (150 ml.) is then added, and the mixture acidified with 73 ml. of concentrated HCl. The aqueous layer is then separated and extracted three times with chloroform. The combined organic solution is washed with brine, dried and concentrated to yield 18.4 g. of a yellow glass, m.p. 98°–147°.

The product is crystallized from 440 ml. of 1:1 ethyl acetate/heptane to yield 11.2 g. of a white solid, m.p. > 150°. The solid is then combined with 2.2 g. of the product (m.p. 150°–160°) obtained from a previous reaction and recrystallized from 500 ml. of 1:1 ethyl acetate/heptane to yield 9.5 g., m.p. 159°–166°, which is combined with 1.5 g. of the solid product (m.p. 148°–165°) and recrystallized twice from ethyl acetate to yield N-acetyl-β-cyclohexyl-3,4-dimethoxyphenylalanine as a white solid, m.p. 170°–172°.

EXAMPLE 4

β-(Cyclohexyl)-3,4-dihydroxyphenylalanine hydrate

A dispersion of 4.0 g. (0.0114 mole) of N-acetyl-β-cyclohexyl-3,4-dimethoxyphenylalanine (m.p. 170°–172°) in 28 ml. of 48% hydrobromic acid is heated to a mild reflux in 0.25 hour and maintained 1 hour. The solution is then cooled and concentrated on a rotary evaporator to yield a glass which is dissolved in 40 ml. of water and concentrated to dryness. This procedure is repeated, and the residual glass then dried by heating in an oil bath at 100° for 0.5 hour at 0.3 mm. pressure. The crude product is then dissolved in 250 ml. of water, filtered and neutralized with Dowex 1-X8 resin (20–50 mesh). The mixture is diluted to 300 ml. with water, heated to 86° and filtered. The filtrate is concentrated to yield 1.7 g. of a white solid. The resin is added to another 300 ml. of water and treated in the same manner to yield another 0.4 g. of white solid.

The products are combined with 0.7 g. of crude material obtained from a reaction run in the same manner and recrystallized from 360 ml. of refluxing water to yield 1.6 g. of a solid product in four crops. The product is further purified by dissolving it in refluxing methanol (approximately 50 ml/100 mg.), treating with activated charcoal, and concentrating under nitrogen until the solid precipitates. The mixture is then cooled and the solids collected and dried. Various crops are then combined and recrystallized in the same manner. Recrystallized products are combined and mixed thoroughly to yield β-(cyclohexyl)-3,4-dihydroxyphenylalanine hydrate as a light grey solid, m.p. 260°–261°.

I claim:

1. A compound of the formula

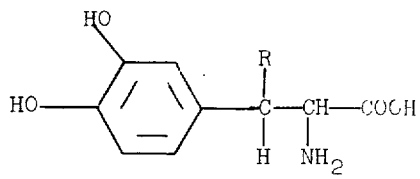

in which R is a cycloalkyl of three to eight carbon atoms, and pharmaceutically acceptable salts thereof.

2. The compound of claim 1 which is β-(cyclohexyl)-3,4-dihydroxyphenylalanine.

* * * * *